United States Patent
Sumner et al.

(10) Patent No.: US 12,524,477 B2
(45) Date of Patent: Jan. 13, 2026

(54) SYSTEMS AND METHODS FOR ENCOURAGING APPLICATION EXPLORATION

(71) Applicant: Toyota Research Institute, Inc., Los Altos, CA (US)

(72) Inventors: Emily Sumner, Mountain View, CA (US); Shabnam Hakimi, San Francisco, CA (US); Alexandre Filipowicz, Mountain View, CA (US); Scott Carter, San Jose, CA (US); Yekaterina Glazko, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/343,089

(22) Filed: Jun. 28, 2023

(65) Prior Publication Data

US 2025/0005087 A1  Jan. 2, 2025

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......... G06F 16/9535; G06F 16/9538
USPC ....................................... 707/722
See application file for complete search history.

(56) References Cited

U.S. PATENT DOCUMENTS

| | | |
|---|---|---|
| 7,152,018 B2 | 12/2006 | Wicks |
| 8,843,433 B2 | 9/2014 | Flinn et al. |
| 9,547,839 B2 | 1/2017 | Luo et al. |
| 10,776,431 B2 | 9/2020 | Su et al. |
| 11,049,604 B2 | 6/2021 | Chakra et al. |
| 11,132,717 B2 | 9/2021 | Kosai et al. |
| 11,334,464 B2 | 5/2022 | Pena et al. |

(Continued)

OTHER PUBLICATIONS

Y. Lu, I. -H. Hsiao and Q. Li, "Exploring Online Programming-Related Information Seeking Behaviors via Discussion Forums," 2016 IEEE 16th International Conference on Advanced Learning Technologies (ICALT), Austin, TX, USA, 2016, pp. 283-287, doi: 10.1109/ICALT.2016.63. (Year: 2016).*

(Continued)

*Primary Examiner* — Michael Pham
(74) *Attorney, Agent, or Firm* — Christopher G. Darrow; Darrow Mustafa PC (57) ABSTRACT

Systems, methods, and other embodiments described herein relate to encouraging exploration within a computing application. In one embodiment, a system includes a processor and a memory storing machine-readable instructions. The instructions, when executed by the processor, cause the processor to identify when a user is stuck in a repetitive pattern within a computing application. When the user is stuck in the repetitive pattern the instructions, the instructions when executed by the processor, cause the processor to encourage the user to further explore the computing application by 1) intervening in user activity within the computing application and 2) presenting attention-capturing content that is targeted to the user and unrelated to a domain of content accessed by the user within the computing application.

20 Claims, 4 Drawing Sheets

(56) References Cited

U.S. PATENT DOCUMENTS

| | | | |
|---|---|---|---|
| 2003/0167195 A1 | 9/2003 | Fernandes et al. | |
| 2006/0259861 A1* | 11/2006 | Watson | H04L 67/535 715/705 |
| 2007/0220010 A1 | 9/2007 | Ertugrul | |
| 2013/0013408 A1 | 1/2013 | Hjelm et al. | |
| 2014/0129539 A1* | 5/2014 | Hayes | G06F 16/9035 707/709 |
| 2016/0232236 A1* | 8/2016 | Vorontcov | H04L 67/02 |
| 2017/0032044 A1* | 2/2017 | Hayes | G06Q 30/0256 |
| 2017/0357660 A1 | 12/2017 | Damgaard Husted | |
| 2024/0202855 A1* | 6/2024 | Presley | G06F 16/93 |

OTHER PUBLICATIONS

Vogl et al. "Surprise, curiosity, and confusion promote knowledge exploration: Evidence for robust effects of epistemic emotions." Frontiers in psychology 10 (2019): 2474.

Schulz et al. "Serious fun: preschoolers engage in more exploratory play when evidence is confounded." Developmental psychology 43.4 (2007): 1045.

Colantonio et al. "Awesome play: Awe increases preschooler's exploration and discovery." 2018.

* cited by examiner

SYSTEMS AND METHODS FOR ENCOURAGING APPLICATION EXPLORATION

TECHNICAL FIELD

The subject matter described herein relates, in general, to computing application usage and, more particularly, to encouraging exploration within a computing application by altering a user's frame of mind with targeted attention-capturing content.

BACKGROUND

Computing devices are becoming ubiquitous in society, with many users interacting with multiple computing devices daily. Computing applications refer to an instruction set package that executes a particular function. One specific example of a computing application is a search application wherein a user locates certain content, such as a document, a web page, or multimedia content, from a corpus of content. The number and variety of computing applications are in the millions and are sure to grow.

In an example, the content is an application feature. Computing applications include features, or sub-packages of instruction sets, that execute particular operations and provide great utility to a user. These features enhance the user's experience within the computing application.

However, it may be the case that user behavior and habits hinder a full realization of the potential of the computing application. For example, a user may fall into a repetitive pattern of searching where they are not finding content that is relevant to their query. As another example, a user, due to historical habits, may not be exploring a particular feature of an application that may serve their intended purpose.

SUMMARY

In one embodiment, example systems and methods relate to a manner of improving user exploration of a computing application.

In one embodiment, an application exploration for encouraging user exploration of a computing application is disclosed. The application exploration system includes one or more processors and a memory communicably coupled to the one or more processors. The memory stores instructions that, when executed by the one or more processors, cause the one or more processors to identify when a user is stuck in a repetitive pattern within a computing application. When the user is stuck in a repetitive pattern, the instructions, when executed by the one or more processors, cause the one or more processors to encourage the user to further explore the computing application by 1) intervening in user activity within the computing application and 2) presenting attention-capturing content that is targeted to the user and unrelated to a domain of content accessed by the user within the computing application.

In one embodiment, a non-transitory computer-readable medium for encouraging application exploration and including instructions that, when executed by one or more processors, cause the one or more processors to perform one or more functions is disclosed. The instructions include instructions to identify when a user is stuck in a repetitive pattern within a computing application. The instructions also include instructions to encourage new behavior when the user is stuck in the repetitive pattern by 1) intervening in user activity within the computing application and 2) presenting attention-capturing content that is targeted to the user and unrelated to a domain of content accessed by the user. The attention-capturing content induces at least one of awe and surprise in the user.

In one embodiment, a method for encouraging application exploration is disclosed. In one embodiment, the method includes identifying when a user is stuck in a repetitive pattern within a computing application. The method includes, when the user is stuck in the repetitive pattern, cognitively resetting the user by intervening in user activity within the computing application and presenting attention-capturing content that is targeted to the user and unrelated to a domain of content accessed by the user. The attention-capturing content induces at least one of awe and surprise in the user. The method also includes re-engaging the user with the computing application following presentation of the attention-capturing content.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving user exploration within computing applications are disclosed herein. As previously described, computing applications have the potential to provide great utility to users in a variety of ways. However, users may get stuck in patterns that preclude the exploitation of the full capability of a computing application. For example, when searching a database or the internet for information, a user may get stuck retrieving the same or similar search results, rather than discovering new content that is potentially better suited to a particular objective. Similarly, a user may miss features of an application as they use the application following a habitual pattern.

Accordingly, the present specification describes systems and methods that 1) intervene in user activity within a computing application and 2) present images, text, or other content that is unrelated to the user's activity and therefore captures the attention of the user. This resets a user's cognitive state, making the user more explorative and open to new content (e.g., search paths). Research indicates that the induction of awe and surprise can lead users to become more explorative and open to new ideas. Accordingly, the systems and methods of the present specification break a user's repetitive and unproductive pattern and induce awe or surprise in the user to encourage exploration and encourage the user to engage in different behaviors within the computing application.

Tracking the user activity may include collecting search history, monitoring application usage, and/or feature usage. A pattern may be determined in various ways, including inverse reinforcement learning logic where subjective values associated with different content are determined and content with subjective values that are "too high" (i.e., meaning they are more likely to be chosen and re-chosen over other options) are flagged.

Responsive to the monitored user activity and identified patterns of repetitive behavior, the application exploration system intervenes and presents content that captures the user's attention (e.g., "content that induces awe and/or surprise"). The attention-capturing content is unrelated to the user's search and is tailored or targeted to the user. As noted above, cognitive psychology suggests that unpredicted pleasant experiences engage stimulation centers of the brain more than content that the user is familiar with and expects. As such, users subconsciously prefer unexpected and pleasant experiences. The intervention into the user's activity provides an unexpected experience while presenting content that is tailored, targeted, or customized for the user ensures that the psychological effect is achieved due to the pleasantness of seeing attention-capturing content that is of particular interest to the user. As such, the present application exploration system does not just present the user with any content, but content that is particularly tailored to induce awe and/or surprise in the user.

For example, if a questionnaire posed to the user or previous user activity within a computing environment suggests the user is an outdoor enthusiast, the attention-capturing content may be of the Grand Canyon or other awe-inspiring outdoor site. Such a targeted approach can result in greater user engagement and connection while avoiding repelling the user with randomly-generated and non-targeted content.

Following the presentation of the attention-capturing content, the application exploration system re-engages the user by prompting the user to search again or by recommending a new feature to explore. Given the cognitively-resetting intervention of the user's activity, the user is more likely to explore new content or view the same content with a new perspective that may lead to increased exploration. Monitoring the user's behavior and habits and interjecting attention-capturing (i.e., awe-inducing) content is repeated throughout electronic device/application usage.

In this way, the disclosed systems, methods, and other embodiments improve user exploration within a computing environment by detecting that a user is repeatedly accessing the same sources or features and inducing awe in a targeted way to aid the user in finding new sources or features.

Figure 1:
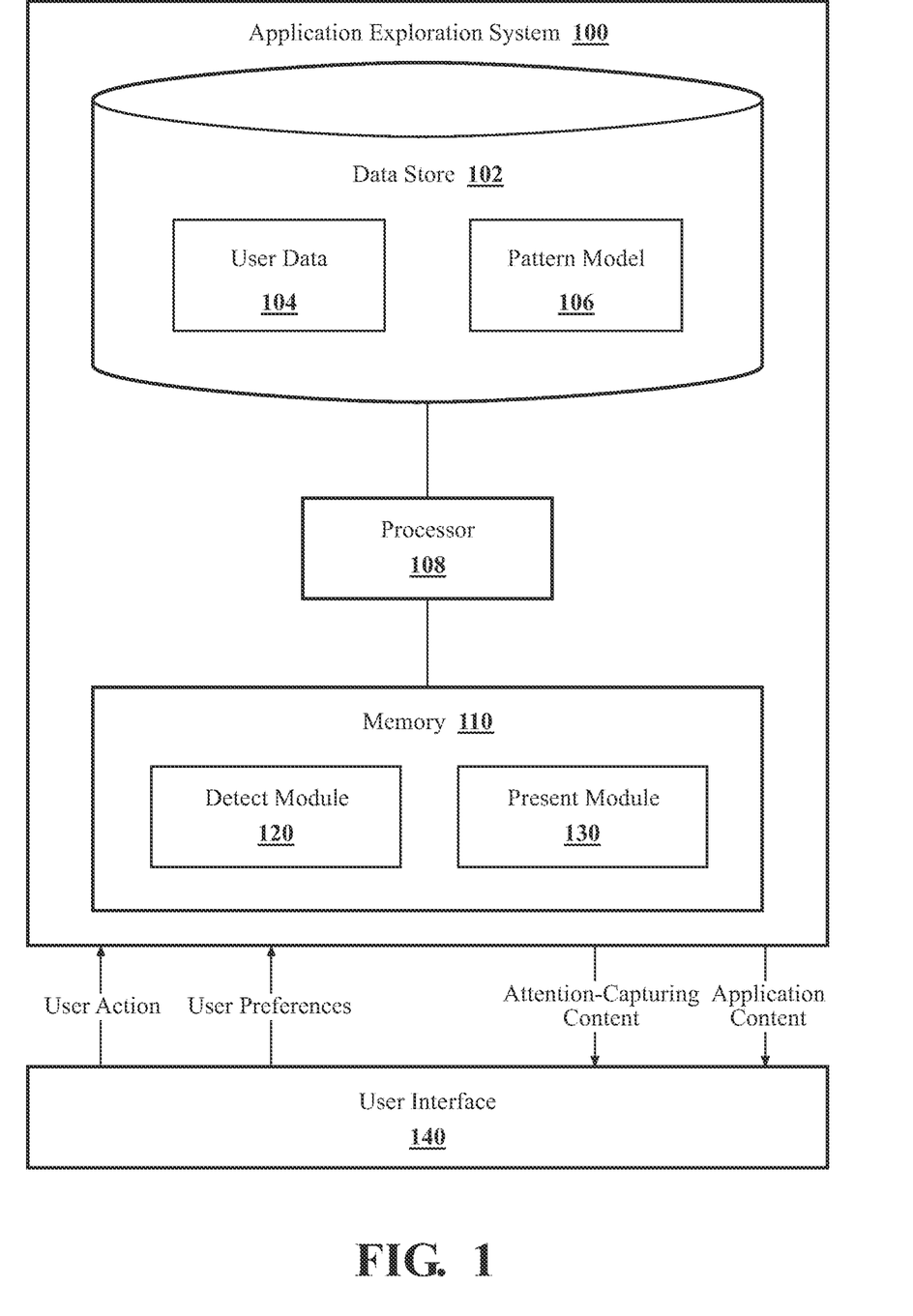
FIG. 1 illustrates one embodiment of an application exploration system that is associated with encouraging user exploration within a computing application.

FIG. 1 illustrates one embodiment of an application exploration system 100 that is associated with encouraging user exploration within a computing application. The application exploration system 100 may reside on or control any number of computing devices, including a desktop computer, a laptop computer, a tablet, a mobile device, or a gaming system, among other computing devices. In some examples, the application exploration system 100 may reside on the computing device in which it is implemented. In another example, the application exploration system is in a cloud-based environment and remotely cooperates with a computing application of the computing device.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the application exploration system 100 is implemented to perform methods and other functions as disclosed herein relating to improving user exploration within a computing application.

The application exploration system 100 is shown as including a processor 108. In one or more arrangements, the processor(s) 108 can be a primary/centralized processor of the computing device in which the application exploration system 100 resides or may be representative of many distributed processing units. For instance, the processor(s) 108 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the computing device.

In an example, the processor 108 may be a part of the application exploration system 100, the application exploration system 100 may include a separate processor 108 from a processor of a computer in which the application exploration system 100 operates, or the application exploration system 100 may access the processor of the computer through a data bus or another communication path.

The application exploration system 100 can include one or more data stores 102 for storing one or more types of data. The data store 102 is, in one embodiment, an electronic data structure stored in the memory 110 or another data storage device and that is configured with routines that can be executed by the processor 108 for analyzing stored data, providing stored data, organizing stored data, and so on. The data store 102 can be comprised of volatile and/or non-volatile memory. Examples of memory that may form the data store 102 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 102 is a component of the processor(s) 108. In general, the data store 102 is operatively connected to the processor(s) 108 for use thereby. The term "operatively connected," as used throughout this description, can include direct or indirect connections, including connections without direct physical contact.

In one embodiment, the data store 102 stores data used by the modules 120 and 130 in executing various functions. In one embodiment, the data store 102 stores the user data 104 and pattern model 106 along with, for example, metadata that characterizes various aspects of the user data 104 and the pattern model 106.

The user data 104 includes information regarding user activity within the computing application as well as user preferences that trigger the presentation of certain attention-capturing content. As described above, the application exploration system 100 determines whether a user is stuck in a particular repetitive pattern. This determination is made based on an analysis of user actions. The application exploration system 100 is coupled to a user interface 140 and receives data indicating user actions. The user interface 140 refers to a component of a computing device through which a user interacts with the computing device and computing applications executing thereon. The user interface 140 includes one or more input devices such as a keyboard, a mouse, a microphone, a touch-sensitive display device, or any other type of user input device. The user interface 140 also includes one or more output devices that present content to the user. Examples of output devices of the user interface 140 include a display device, a speaker, or any other type of output device. Through these input/output devices, a user interacts with the computing applications of a computing device. The detect module 120 is communicatively coupled to the user interface 140 and the input and output devices to monitor user interaction within the computing device.

For example, the detect module 120 may execute a keystroke logger to identify the keystrokes of a user interacting with a computing application. Similarly, the detect module 120 may receive data from other input devices to determine how the user interacts with the computing application. The detect module 120 may also execute application monitors to collect information regarding application usage. Such information may include timestamps, usage rates, and access instances for the features and sub-features of a computing application. In one particular example where the computing application is a search application, the collected user data 104 may include a search history for the user. While particular reference is made to particular ways in which the detect module 120 monitors user activity, the detect module 120 may detect user activity in any number of ways. Regardless of the monitoring mechanism, this information is stored in the data store 102 as user data 104 and relied on by the detect module 120 to identify when the user is stuck in a particular repetitive pattern.

The user data 104 also includes user preferences regarding the attention-capturing content to be presented. As described above, the application exploration system 100 alters or shifts the user's cognitive state by presenting content unrelated to the content the user is currently accessing through the computing application. To ensure that the cognitively-resetting attention-capturing content has the intended effect, the user data 104 includes user preferences by which the attention-capturing content is selected. That is, cognitively-resetting content may have a more significant effect if the content is of particular relevance or interest to the user. For example, for a user with a fear of water but an admiration for mountainous terrain, presenting attention-capturing content related to the beach may have a chilling effect on a user's exploration compared to an image of a mountain landscape.

The user preferences may be identified in a variety of ways. In one example, the detect module 120 presents a questionnaire to the user through which the user's preferences regarding attention-capturing content are captured. In another example, the user interaction with the computing application or with the computing device, in general, may be indicative of the user preferences. For example, a user's frequent search for historical architectural designs may indicate that the user admires architectural history. This preference may trigger the presentation of attention-capturing content related to awe-inspiring or surprise-inducing architectural structures. While particular reference is made to particular mechanisms for determining user preferences regarding attention-capturing content, the detect module 120 may determine the user preferences in various ways.

The data store 102 also includes the pattern model 106 used by the detect module 120 to determine whether the user activity within a computing environment indicates a pattern of behavior. As described above, user activity within the computing application may suggest that the user is stuck in a repetitive pattern wherein the user is not exploring certain features of the computing application or not accessing certain content of the computing application. In a search application context, user activity may suggest that a user is querying with specific search terms or accessing specific search results to the exclusion of other search terms and/or results that may be helpful to the user. The pattern model 106, which may be a machine-learning model, when relied on by the detect module 120, identifies when the user activity rises to the level of a repetitive pattern of behavior.

As described previously, application exploration system 100 can include one or more modules, at least some of which are described herein. In at least one arrangement, the modules are implemented as non-transitory computer-readable instructions that, when executed by the processor 108, implement one or more of the various functions described herein. In various arrangements, one or more of the modules are a component of the processor(s) 108, or one or more of the modules are executed on and/or distributed among other processing systems to which the processor(s) 108 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

In one embodiment, the application exploration system 100 includes a memory 110 that stores the detect module 120 and the present module 130. The memory 110 is a random-access memory (RAM), read-only memory (ROM), a hard-disk drive, a flash memory, or another suitable memory for storing the modules 120 and 130. The modules 120 and 130 are, for example, computer-readable instructions that when executed by the processor 108 cause the processor 108 to perform the various functions disclosed herein. In alternative arrangements, the modules 120 and 130 are independent elements from the memory 110 that are, for example, comprised of hardware elements. Thus, the modules 120 and 130 are alternatively ASICs, hardware-based controllers, a composition of logic gates, or another hardware-based solution.

The detect module 120, in one embodiment, includes instructions that cause the processor 108 to identify when a user is stuck in a repetitive pattern within a computing application. The present module 130, in cooperation with the output of the detect module 120, presents attention-capturing content to alter the in-application behavior of the user to explore the additional features or content of the computing application.

The identification of a repetitive pattern may occur in a variety of ways. In one example, the detect module 120 identifies when the user accesses a subset of available content of the computing application without accessing other content. Such a determination may be based on user data 104 (e.g., keystroke logs, application usage statistics, etc.). For example, if the access rates of first content differ by a threshold amount from the access rates of second content, the detect module 120 identifies the user as stuck on the first content. When specific content is accessed a threshold amount more than other content, the detect module 120 identifies that the user has become stuck in a pattern where they fail to appreciate the complete set of available content.

As a specific example, upon searching for "vehicles," a user may repeatedly access search results related to internal combustion engine vehicles while not accessing search results related to electric vehicles. In this example, based on the user accessing a subset of resources (e.g., search results related to internal combustion engine vehicles) to the exclusion of other resources (e.g., search results related to electric vehicles), the detect module 120 may determine that the user is stuck in a pattern of exploring resources related to internal combustion engine vehicles when the user may also benefit from exploring resources related to electric vehicles. As described above, such a determination of a user being "stuck" may be based on any number of user monitoring mechanisms, including keystroke logging, monitoring other user input devices such as a mouse or a touch-screen, and application monitoring, among others.

In one particular example, the detect module 120, in conjunction with the pattern model 106, implements inverse reinforcement learning logic to identify the subset of available content that is accessed to the exclusion of other content. In inverse reinforcement learning, a user may execute any number of actions, where an action refers to a user accessing a particular resource on the computer application. Each action has a subjective value associated with it. The more value a particular action has, the more likely a user is to complete that action. If the user repeatedly chooses from a similar set of content, that content would have a higher subjective value. In comparison, other less-accessed content would have a relatively lower subjective value. The higher the subjective value of particular content relative to other content, the greater the indication that the user is stuck on the higher-valued content. In other words, a large difference between subject values (i.e., greater than a threshold amount) indicates the user is stuck in a particular pattern. While particular reference is made to one form of determining whether a user is stuck based on repetitive patterns, the detect module 120 may implement other methods as well.

It should be appreciated that the detect module 120, in combination with the pattern model 106, can form a computational model such as a machine learning logic, deep learning logic, a neural network model, or another similar approach. In one embodiment, the pattern model 106 is a statistical model such as a regression model that identifies/predicts repetitive patterns based on user data 104 or other sources of information as described herein. Accordingly, the pattern model 106 can be a polynomial regression (e.g., least weighted polynomial regression), least squares or another suitable approach.

Moreover, in alternative arrangements, the pattern model 106 is a probabilistic approach such as a hidden Markov model. In either case, the detect module 120, when implemented as a neural network model or another model, in one embodiment, electronically accepts the user data 104 as an input, which may include data indicative of user activity. Accordingly, the detect module 120, in concert with the pattern model 106, produces various determinations/assessments as an electronic output that characterizes the noted aspect as, for example, a single electronic value. Moreover, in further aspects, the application exploration system 100 can collect the noted data, log responses, and use the data and responses to subsequently further train the pattern model 106.

In any case, the detect module 120, when implemented with a neural network model or another model, in one embodiment, implements functional aspects of the pattern model 106 while further aspects, such as learned weights, may be stored within the data store 102. Accordingly, the pattern model 106 is generally integrated with the detect module 120 as a cohesive functional structure.

The present module 130, in one embodiment, includes instructions that cause the processor 108 to encourage the user to explore the computing application further when the user is stuck in a repetitive pattern. As described above, intervention into the user's activity is an unexpected event and thus serves to reset the user's cognitive state. More specifically, intervention into the user's activity, e.g., searching, cognitively resets the user such that the user subsequently engages in different patterns or behaviors within the computing environment.

To complete the cognitive reset, the present module 130 presents the attention-capturing content on the user interface 140. The attention-capturing content is outside of a domain, or context, of the user's activity within the computing application. That is, transitioning from consuming the original content related to a first topic to consuming the attention-capturing content related to a second and unrelated topic shifts the user's mind state, which state shift induces or encourages the user to explore new content of the computing application.

For example, if the user is searching for financial investment tools, the attention-capturing content may be related to another subject, such as nature. In other words, attention-capturing content is not content that relates to what the user is searching, but is specifically intended to be unrelated to promote a context switch within the user. As such, the user's focus switches from financial investment tools to nature.

The cognitive-resetting effects are enhanced if the attention-capturing content is pleasant. As such, the attention-capturing content is targeted to a specific individual. In this example, the present module 130 identifies user preferences regarding the attention-capturing content and presents attention-capturing content based on those preferences.

In one example, the attention-capturing content has a different format from the original content. For example, a user may be accessing textual documents. Presenting attention-capturing images when user activity is related to textual documents provides a more thorough context shift as not only is the subject matter of the content different, but the modality of content presentation is different.

The attention-capturing content may have a variety of forms and may be presented in various ways. For example, the attention-capturing content may be at least one of textual, image, and multimedia content, among others.

Figure 3A:
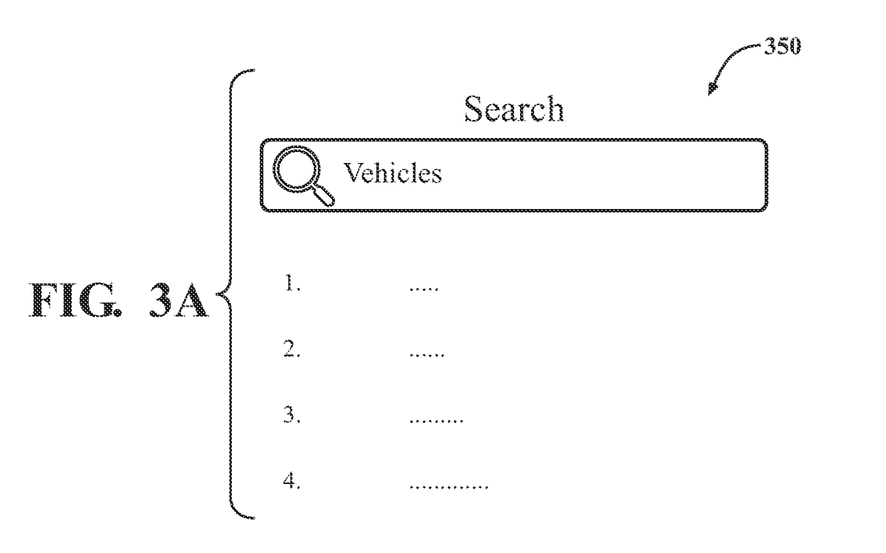
FIGS. 3A-3C illustrate the encouragement of user exploration within a computing environment.
Figure 3B:
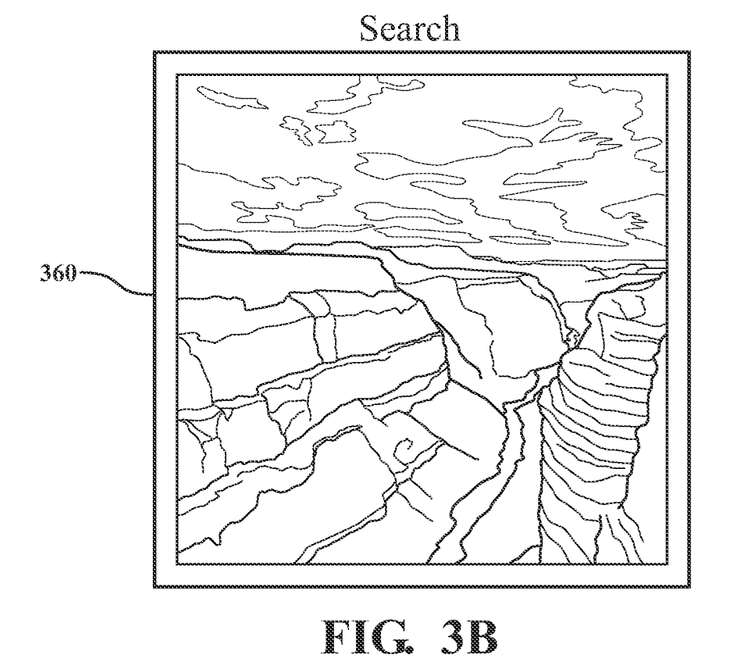
Figure 3C:
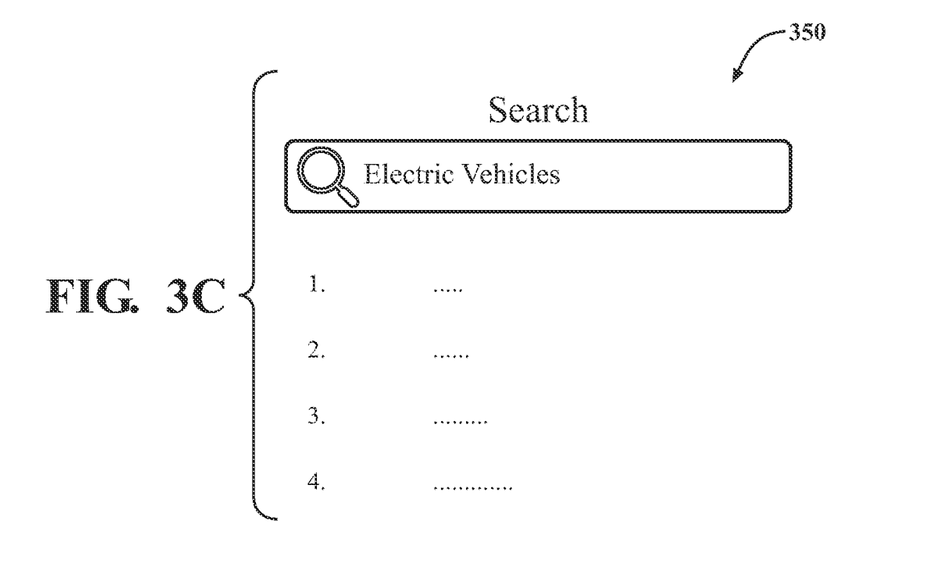

The intervention into the user's activity and presentation of the attention-capturing content may take a variety of forms. In one example, intervention in the user's activity includes interrupting the user's activity. For example, as depicted in FIGS. 3A-3C, the attention-capturing content is presented in a window that overlays the computing application. In this example, the present module 130 interacts with the user interface 140 of the computing device to temporarily disable the user's activity within the computing application and encourage new behavior by cognitively resetting the user via interrupting, awe-inspiring, and targeted content for the user.

In another example, intervention may be more subtle. For example, the intervention may not interrupt the user's activity but supplement the user's activity. For example, in an image search environment, a user may search for images of an engine component. In the gallery of search result images, the present module 130 may display an aerial image of the Grand Canyon. Thus, the user's activity is not interrupted; instead, the attention-capturing content is presented alongside the content-related search results.

In summary, attention-capturing content is content that switches the conscious thought of the user from one topic, subject, or domain to another. This switch alters the frame of mind of the user. Psychological experiments show that changing the user's frame of mind may increase receptivity to new ideas. As such, the present module 130 alters the state of mind of the user in a way to reset the cognitive state of the user from 1) one in which they are more likely to continue a repeated behavior to 2) one in which they are more open to new and/or different resources of the computing application.

Following the presentation of the attention-capturing and awe-inducing content, the present module 130 may re-engage the user with the computing application. Due to the cognitive reset and context switch induced by the targeted attention-capturing content, the user interaction with the computing application may differ. As such, the application exploration system 100 presents the content of the computing application to the user to capitalize off the new frame/state of mind of the user. In a particular example, the present module 130 re-engages the user with the same content following the presentation of the attention-capturing content.

As a particular example, following a repetitive search for "family vehicle" and an awe-inducing interaction with targeted attention-capturing content, the present module 130 may present the same search results as would have been presented were the user activity not interrupted. However, due to the cognitive shift experienced by the user, the interaction with the search results may be different. For example, the user may be more open to other search results.

As another example, the present module 130 may re-engage the user with a search query page. Again, due to the cognitive shift experienced by the user, the user's new state of mind may induce them to use different search terms.

In a non-search example, the present module 130 may represent the user with the same feature, e.g., the same page, of a computing application. However, the user with the altered frame of mind may interact with that page of the computing application differently.

In another example, the present module 130 may present new content of the computing application to the user following the presentation of the attention-capturing content. In this example, the domain, topic, or subject matter of the new content relates to the domain of the content previously accessed by the user. Given the cognitive reset of the user via the targeted and unrelated attention-capturing content, the user may be open to the new, previously unexplored content. For example, following a search for the term "vehicle" and an awe-inducing intervention into the user activity with targeted attention-capturing content, the present module 130 may present new search results that are different, perhaps broader, than the search results that would be retrieved were the user not stuck in their search behavior.

In one or more configurations, the application exploration system 100 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the application exploration system 100 or another system generally trains the machine learning algorithm according to a particular training approach, which may include supervised training, self-supervised training, reinforcement learning, and so on. In contrast to training/learning of the machine learning algorithm, the application exploration system 100 implements the machine learning algorithm to perform inference. Thus, the general use of the machine learning algorithm is described as inference.

As such, following the re-engagement of the user with the content/resources of the computing application, the application exploration system 100 may continue to monitor user activity within the computing application to determine the effect of the encouragement. For example, the application exploration system 100 may compare pre-encouragement user activity within the computing application with post-encouragement user activity within the computing application. This may include comparing pre- and post-encouragement content access rates to identify any change that could be attributed to the action of the application exploration system 100. The application exploration system 100 can collect the noted data, log responses, and use the data and responses to subsequently further train the pattern model 106.

In an example, the application exploration system 100, in various embodiments, is implemented partially within the computing device, and as a cloud-based service. For example, in one approach, functionality associated with at least one module of the application exploration system 100 is implemented within the computing device while further functionality is implemented within a cloud-based computing system. Thus, the application exploration system 100 may include a local instance at the computer and a remote instance that functions within the cloud-based environment.

Figure 2:
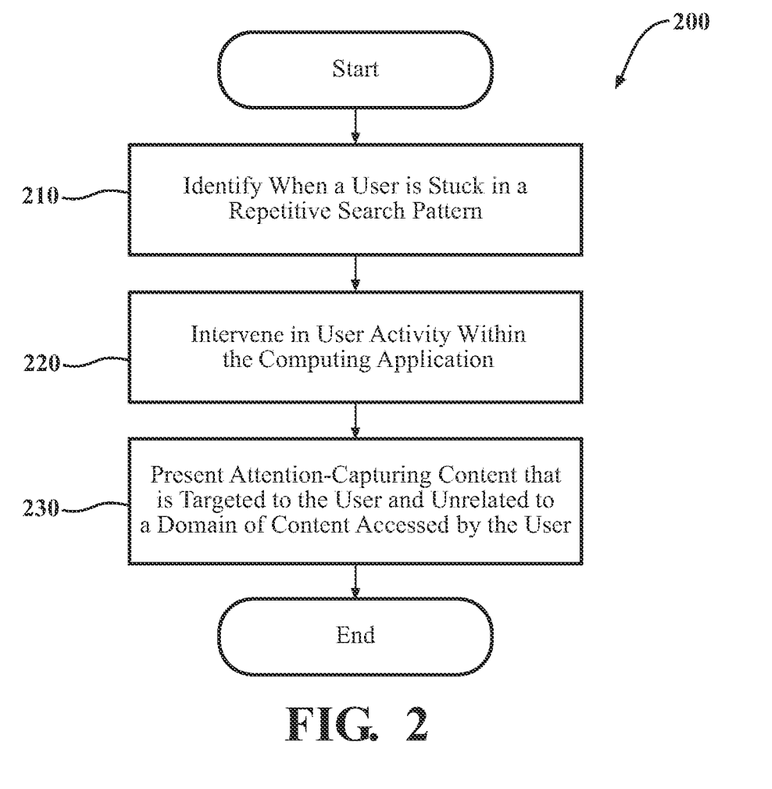
FIG. 2 illustrates a flowchart for one embodiment of a method that is associated with encouraging user exploration within a computing application.

Additional aspects of encouraging application exploration will be discussed in relation to FIG. 2. FIG. 2 illustrates a flowchart of a method 200 that is associated with intervening in a user's activity within a computing application to encourage exploration within the computing application. Method 200 will be discussed from the perspective of the application exploration system 100 of FIG. 1. While method 200 is discussed in combination with the application exploration system 100, it should be appreciated that the method 200 is not limited to being implemented within the application exploration system 100 but is instead one example of a system that may implement the method 200.

At 210, the application exploration system 100, and more particularly the detect module 120 in coordination with the pattern model 106, identifies when a user is stuck in a repetitive search pattern. As described above, this is based on user activity such as keystrokes, application usage, feature usage, etc. From this user activity, the detect module 120 determines whether the activity indicates a behavior where the user is accessing certain content while excluding other content. As described above, such a determination may be based on machine-learning logic, such as inverse reinforcement logic.

At 220, the application exploration system 100, and more particularly the present module 130, intervenes in the user activity within the computing application. This too may occur in various ways, including 1) disabling the computing application and presenting a popup window notifying the user of the interruption or 2) presenting attention-capturing content alongside the original content.

At 230, the application exploration system 100, and more particularly the present module 130, presents attention-capturing content to the user. The attention-capturing content is unrelated to the domain of the previous user activity. The domain switch induces a cognitive shift in the user, which has been proven to increase the user's receptivity to new and different ideas. Moreover, the attention-capturing content, intended to induce awe or surprise, is targeted to the user such that it is a pleasant and not repelling experience. A specific example of the functionality of the application exploration system 100 is now presented.

Specifically, FIGS. 3A-3C illustrate the encouragement of user exploration within a computing application by interrupting a user's activity within the computing application. In the examples depicted in FIGS. 3A-3C, the computing application is a search application 350. Within the search application 350, a user enters a particular search query in a field and a search engine provides results relevant to the query. In the example depicted in FIG. 3A, the user is searching for resources/content related to "vehicles." As described above, based on the user activity within the search application 350, the application exploration system 100 may determine that the user is stuck in a repetitive search pattern. A user may be stuck in a repetitive search pattern by repeatedly searching using the same or similar terms or selecting the same or similar search results. For example, the user may repeatedly select search results related to internal combustion engine vehicles. Responsive to this detected repetitive pattern, the application exploration system 100 aims to reset the user's cognitive state to encourage new behavior within the search application 350.

Accordingly, as depicted in FIG. 3B, the present module 130 presents attention-capturing content 360. The content may be of various types, including text, multimedia, or as in the case depicted in FIG. 3B, an image. As described above, the domain or topic of the attention-capturing content 360 (e.g., an image of the Grand Canyon) is unrelated to the domain or topic of the search (e.g., vehicles). Moreover, this attention-capturing content 360 is selected based on user preferences. For example, via previous activity within a computing environment, responses to a questionnaire, or another mechanism, the detect module 120 may ascertain that a natural wonder particularly resonates with the user. As such, the present module 130 selects an image of a natural wonder (e.g., the Grand Canyon) as attention-capturing content that is to induce awe within the user and that is to cognitively reset a frame of mind of the user due to a context switch in the brain of the user from analyzing search results related to vehicles to viewing an image of a natural wonder.

Following the cognitive reset, the application exploration system 100 capitalizes on the new cognitive state of the user to enhance the user experience with the computing application. In one example, this includes re-engaging the user with the initial search query (i.e., the search query presented in FIG. 3A). Due to the cognitive reset induced by the targeted and unrelated attention-capturing content 360, the user may be more open to other search results than those accessed while the user exhibited repetitive patterns.

In another example as depicted in FIG. 3C, the present module 130 may re-engage the user with the search application 350 by presenting a new search query to the user following presentation of the attention-capturing content. Following the presentation of the attention-capturing content, the user's state of mind may be such that they are more open to new resources. As such, the present module 130 may present new content in the form of a new search query for "electric vehicles." Given the altered cognitive state of the user, the user may be more likely to engage with this additional content that was previously unexplored due to the user's repetitive activity.

Figure 4:
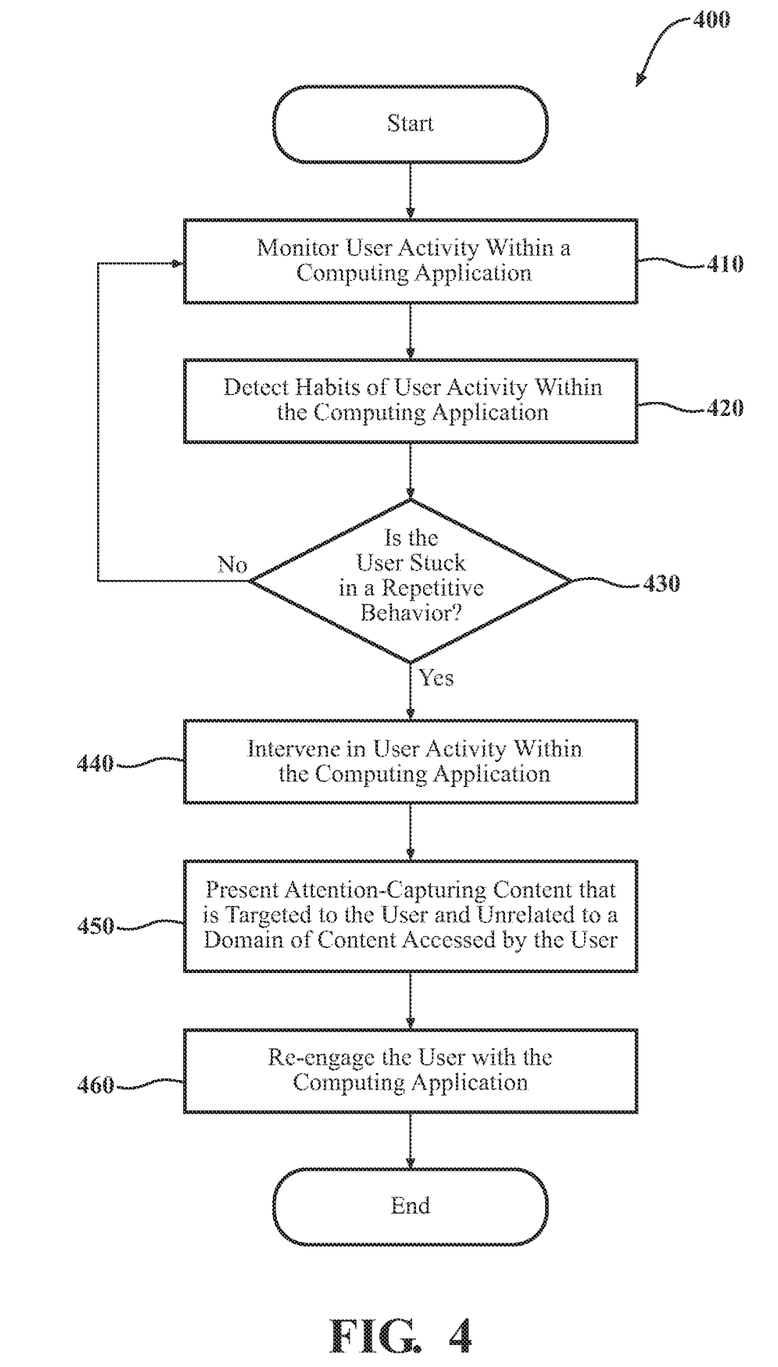
FIG. 4 illustrates a flowchart for one embodiment of a method that is associated with encouraging user exploration within a computing application.

Additional aspects of encouraging application exploration will be discussed in relation to FIG. 4. FIG. 4 illustrates a flowchart of a method 400 that is associated with intervening in a user's activity within a computing application to encourage exploration within the computing application. Method 400 will be discussed from the perspective of the application exploration system 100 of FIG. 1. While method 400 is discussed in combination with the application exploration system 100, it should be appreciated that the method 400 is not limited to being implemented within the application exploration system 100 but is instead one example of a system that may implement the method 400.

At 410, the application exploration system 100, and more particularly the detect module 120, monitors user activity within a computing application. That is, a computing device includes a number of input devices. The application exploration system 100 is communicatively coupled to these input devices and monitors the input devices to provide user data indicative of a repetitive pattern.

At 420, the application exploration system 100, and more particularly the detect module 120 in coordination with the pattern model 106, detects habits of user activity within the computing application. Habitual patterns may include repetitive behaviors or activities. In the context of a search application, a repetitive pattern may be that a user performs a repeated search query or accesses similar search results to the exclusion of other search results.

At 430, the detect module 120 determines whether the user is stuck in a repetitive behavior. If not, the application exploration system 100 continues monitoring user activity within the computing application. That is, the application exploration system 100 continuously monitors user activity to ascertain when a user becomes stuck.

If the user is stuck, at 440, the application exploration system 100, and more particularly the present module 130, intervenes in user activity within the computing application. This too may occur in various ways, including disabling the computing application, presenting a popup window notifying the user of the interruption, or other mechanisms.

At 450, the application exploration system 100, and more particularly the present module 130, presents attention-capturing content to the user. The attention-capturing content is unrelated to the domain of the previous user activity. The domain switch induces a cognitive shift in the user, which has been proven to increase the user's receptivity to new and different ideas. Moreover, the attention-capturing content, which is intended to induce awe or surprise, is targeted to the user such that it is a pleasant and not repelling experience for the user.

At 460, the application exploration system 100, and more particularly the present module 130, re-engages the user with the computing application following the presentation of the attention-capturing content 360. Doing so capitalizes on the cognitive shift of the user's frame of mind to present the user with the content in the same way, or in a different way, such that the user interacts differently with the content. As such, the present method 400 enhances a user's experience within a computing application by encouraging exploration responsive to a context-shifting and awe-inducing interruption of a user's activity with targeted and unrelated attention-capturing content.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
identify a user preference regarding a topic of attention-capturing content to be presented to a user;
identify, by an application exploration system, when the user is stuck in a repetitive pattern within a computing application while accessing content having a first topic;
when the user is stuck in the repetitive pattern, with the application exploration system:
interrupt user activity within the computing application by disabling the computing application; and
present the attention-capturing content that is targeted to the user and based on the user preference, the topic of the attention-capturing content is unrelated to the first topic of the content accessed by the user from the computing application.

2. The system of claim 1, wherein the machine-readable instructions further comprise an instruction that, when executed by the processor, causes the processor to re-engage the user with the content following presentation of the attention-capturing content.

3. The system of claim 1, wherein the machine-readable instructions further comprise an instruction that, when executed by the processor, causes the processor to present new content of the computing application to the user following presentation of the attention-capturing content, wherein a domain of the new content relates to a domain of the content accessed by the user.

4. The system of claim 1, wherein the machine-readable instructions further comprise an instruction that, when executed by the processor, causes the processor to evaluate an effect of encouragement by comparing pre-encouragement user activity within the computing application with post-encouragement user activity within the computing application.

5. The system of claim 1, wherein the machine-readable instruction to identify when the user is stuck in the repetitive pattern comprises an instruction that, when executed by the processor, causes the processor to identify when the user accesses a subset of available content of the computing application without accessing other content of the computing application.

6. The system of claim 5, wherein the machine-readable instruction to identify the subset of available content comprises an instruction that, when executed by the processor, causes the processor to identify content for which user interaction is a threshold amount above user interaction with the other content as the subset.

7. The system of claim 1, wherein the machine-readable instruction that causes the processor to present attention-capturing content comprises a machine-readable instruction that causes the processor to present the attention-capturing content in a format that is different than a format of the content accessed by the user.

8. The system of claim 1, wherein:
the machine-readable instruction to identify when the user is stuck in the repetitive pattern comprises a machine-readable instruction that, when executed by the processor, causes the processor to identify, by the application exploration system, when the user is stuck in the repetitive pattern within a search application while accessing content-related results having the first topic of a search query;
the machine-readable instruction to interrupt user activity within the computing application by disabling the computing application comprises a machine-readable instruction that, when executed by the processor, causes the processor to, by the application exploration system, interrupt user activity within the search application by disabling the search application; and
the attention-capturing content is unrelated to the first topic of the search query of content-related results presented in the search application.

9. The system of claim 1, wherein the machine-readable instruction to identify the user preference regarding the topic of the attention-capturing content to be presented to the user comprises a machine-readable instruction that, when executed by the processor, causes the processor to capture the user preferences from a questionnaire from the application exploration system.

10. A non-transitory machine-readable medium comprising instructions that, when executed by a processor, cause the processor to:
identify a user preference regarding a topic of attention-capturing content to be presented to a user;
identify, by an application exploration system, when the user is stuck in a repetitive pattern within a computing application while accessing content having a first topic;
when the user is stuck in the repetitive pattern, with the application exploration system:
interrupt user activity within the computing application by disabling the computing application; and
present the attention-capturing content that is targeted to the user and based on the user preference, the topic of the attention-capturing content is unrelated to the first topic of the content accessed by the user from the computing application.

11. The non-transitory machine-readable medium of claim 10, wherein:
the computing application is a search application;
the user activity comprises performing a search query, the search query is directed to the first topic;
the content comprises results of the search query;
the instruction to identify when the user is stuck in the repetitive pattern comprises an instruction that causes the processor to identify, by the application exploration system, when the user is stuck in the search application while accessing the results, the results having the first topic of the search query;
the instruction to interrupt user activity within the computing application by disabling the computing application comprises an instruction that causes the processor to interrupt the user activity within the search application by disabling the search application; and
the attention-capturing content is unrelated to the first topic of the search query.

12. The non-transitory machine-readable medium of claim 11, wherein the instructions further comprise an instruction that, when executed by the processor, causes the processor to re-engage the user with the search query following presentation of the attention-capturing content.

13. The non-transitory machine-readable medium of claim 11, wherein the instructions further comprise an instruction that, when executed by the processor, causes the processor to present a new search query to the user following presentation of the attention-capturing content, wherein the new search query relates to a domain of the search query.

14. The non-transitory machine-readable medium of claim 10, wherein the instruction that causes the processor to present attention-capturing content comprises an instruction that causes the processor to present the attention-capturing content in a format that is different than a format of the content accessed by the user.

15. A method, comprising:
identifying a user preference regarding a topic of attention-capturing content to be presented to a user;
identifying, by an application exploration system, when the user is stuck in a repetitive pattern within a computing application while accessing content having a first topic;
when the user is stuck in the repetitive pattern, with the application exploration system:
interrupting user activity within the computing application by disabling the computing application; and
presenting the attention-capturing content that is targeted to the user and based on the user preference, the topic of the attention-capturing content is unrelated to the first topic of the content accessed by the user from the computing application.

16. The method of claim 15, further comprising re-engaging the user with the computing application following presentation of the attention-capturing content.

17. The method of claim 16, wherein re-engaging the user with the computing application comprises presenting new content of the computing application to the user following presentation of the attention-capturing content, wherein a domain of the new content relates to a domain of the content accessed by the user.

18. The method of claim 15, wherein identifying when the user is stuck in the repetitive pattern comprises identifying when the user accesses a subset of available content of the computing application without accessing other content of the computing application.

19. The method of claim 15, wherein presenting attention-capturing content that is targeted to the user and unrelated to the first topic of the content accessed by the user comprises presenting the attention-capturing content in a window overlaying the computing application.

20. The method of claim 15, wherein:
- identifying when the user is stuck in the repetitive pattern comprises identifying, by the application exploration system, when the user is stuck in a search application while accessing content-related results having the first topic of a search query;
- interrupting user activity within the computing application by disabling the computing application comprises, by the application exploration system, interrupting user activity within the search application by disabling the search application; and
- the attention-capturing content is unrelated to the first topic of the search query of content-related results presented in the search application.

* * * * *